April 28, 1936.  J. BABLER  2,039,139
CIRCUIT ARRANGEMENT FOR INDIRECTLY HEATED VACUUM TUBES
Filed April 10, 1934
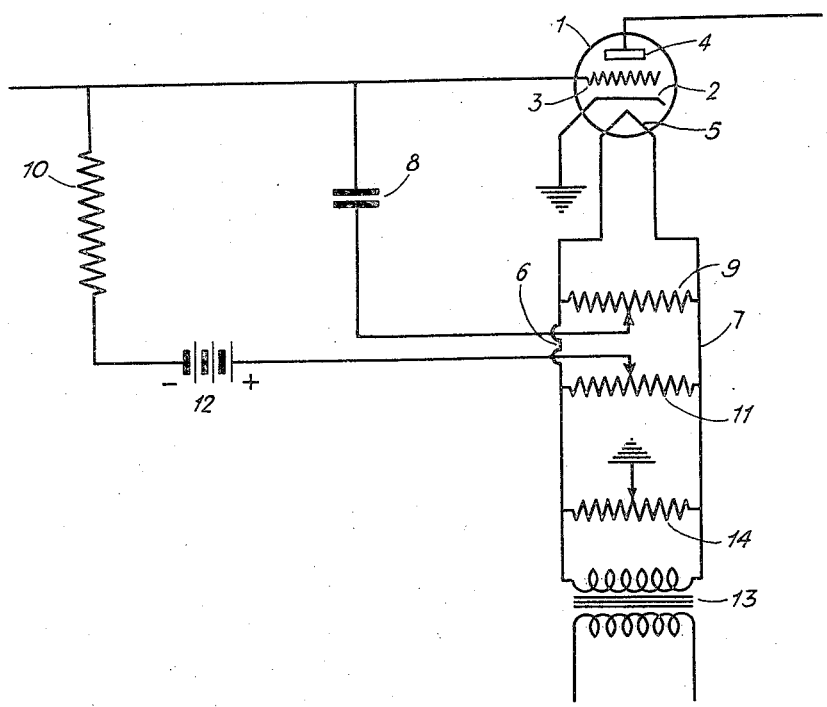
INVENTOR
JUSTUS BABLER
BY *H. S. Grover*
ATTORNEY Patented Apr. 28, 1936

2,039,139

UNITED STATES PATENT OFFICE 2,039,139

CIRCUIT ARRANGEMENT FOR INDIRECTLY HEATED VACUUM TUBES

Justus Babler, Berlin-Frohnau, Germany, assignor to Telefunken Gesellschaft für Drahtlose Telegraphie mit beschränkter Haftung, Berlin, Germany, a corporation of Germany Application April 10, 1934, Serial No. 719,836
In Germany April 19, 1933

3 Claims. (Cl. 250—27)

This invention relates to an improved circuit arrangement for indirectly heated vacuum tubes which are connected to an alternating current or pulsating direct current supply.

In a parent German patent application, a circuit arrangement for tubes indirectly heated by alternating current or pulsating direct current has been disclosed in which additional coupling resistances are provided between the heating leads and the grid which complement the disturbing or stray coupling resistances prevailing between the grid and the heating leads, and which are ascribable to the distributed capacitances of the metallic parts of the circuits and shunts in the form of creepage currents between these parts as regards their ohmic and capacitive components, in such a way that the stray potentials arising at the coupling resistances are neutralized as regards their action upon the grid. Such a circuit scheme proves particularly useful in the amplification of extremely feeble alternating potentials as produced, for instance, in photo-electric cells where otherwise the stray level would lie so high that useful amplification of such low voltages would become doubtful.

In the parent German patent application mentioned above several embodiments of this idea have been disclosed. In one of these the grid is united with the heating leads in each case by way of a coupling branch comprising an adjustable capacity with paralleled variable resistance. In another embodiment the grid is united with the heating leads by way of a coupling branch consisting in each case of a variable capacity or variable resistance, while the cathode is connected with the adjustable tap of a potentiometer inserted between the heating wire leads.

In the practical embodiment of such circuit schemes, certain difficulties will arise in the choice of suitable adjustable capacities and variable resistances, for the requisite capacities are extremely low, in fact, they are of an order of magnitude of a few centimeters, whereas the required resistances are very high, that is to say, of an order of a few megohms. And capacities and resistances of this kind are hard to make so as to be handily adjustable to any desired value.

According to this invention, the circuit arrangement and its practical adoption are substantially facilitated by that fixed capacities and fixed resistances are employed which are united with the adjustable taps of each of the potentiometers connected between the heating leads.

One embodiment of the invention shall be explained in more detail by reference to the drawing. 1 is an amplifier tube with an indirectly heated cathode 2, control grid 3 and anode 4. The cathode is supplied by the heater wire 5 which is united with the heating leads 6 and 7, for instance, by means of the transformer 13 from a suitable source of alternating current. Instead of this arrangement, the heating could be effected also by the rectified supply-line current, the latter, in this instance, containing pulsations or ripples. The heating leads are directly united by way of the adjustable tap of a potentiometer 14 and grounded. Associated with grid 3 and cathode 4 for instance, as well known in the art, is a photo-cell arrangement, the current of which is to be amplified.

Now, according to this invention the grid is connected by way of a fixed capacity 8 with the adjustable tap of a potentiometer 9 inserted between the heating wire leads and in addition the grid is associated by way of a fixed ohm resistance 10 with the adjustable tap or slide of another potentiometer 11 disposed between the heating wire leads. In the connecting lead of the resistance 10 there may optionally be provided a biasing voltage supply 12 of suitable size.

By suitable adjustment of the tap in potentiometers 9 and 11 the desired neutralization of the stray potentials is attainable in reference to the grid of the amplifier tube.

I claim:—

1. A circuit arrangement for tubes indirectly heated by an undulatory current in which the spurious coupling resistances prevailing between the heating leads and the grid are complemented by supplemental coupling elements connected between said grid and heating leads, with this characteristic feature that the grid is connected in each case by way of a fixed reactance and a fixed resistance with a potentiometer having an adjustable tap, said potentiometer being connected between the heating leads.

2. An electron discharge tube circuit arrangement comprising an electron discharge device having a grid, plate, cathode and filament, means for heating said filament by an alternating current supply comprising a heating transformer, a plurality of variable resistances connected across the leads of said filament supply, each of said resistances having a variable connection at substantially the center portion of said resistance, the first of said resistances having its center point connected to ground, the second of said resistances having its center point connected to a direct current bias potential which is connected in series with a fixed resistance and connected to said grid, the third of said resistances having its center point connected to a fixed capacity, connected in series with said grid, all of which cooperate to reduce disturbing stray currents between the grid and filament leads of said electron discharge device.

3. An electron discharge tube circuit arrangement comprising an electron discharge device having a grid, plate, cathode and filament, means for heating said filament by an alternating current supply comprising a heating transformer, a plurality of variable resistances connected across the leads of said filament supply, each of said resistances having a variable connection at substantially the center portion of said resistance, the first of said resistances having its variable connection point connected to ground, the second of said resistances having its variable connection point connected to a direct current bias potential which is connected in series with a fixed resistance and connected to said grid, the third of said resistances having its variable connection point connected to a fixed capacity, connected in series with said grid, all of which cooperate to reduce disturbing stray currents between the grid and filament leads of said electron discharge device.

JUSTUS BABLER.